US008922032B2

(12) United States Patent
Hiranuma et al.

(10) Patent No.: US 8,922,032 B2
(45) Date of Patent: Dec. 30, 2014

(54) ENGINE OPERATING MACHINE

(71) Applicant: Honda Motor Co., Ltd., Tokyo (JP)

(72) Inventors: Junji Hiranuma, Wako (JP); Teruhiko Otsuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 13/659,128

(22) Filed: Oct. 24, 2012

(65) Prior Publication Data

US 2013/0099492 A1 Apr. 25, 2013

(30) Foreign Application Priority Data

Oct. 25, 2011 (JP) ................................. 2011-233951

(51) Int. Cl.

*F02B 63/04* (2006.01)
*H02K 7/18* (2006.01)
*F01P 1/06* (2006.01)
*F01P 1/02* (2006.01)

(52) U.S. Cl.

CPC ................. *F01P 1/06* (2013.01); *F02B 63/044* (2013.01); *F02B 2063/045* (2013.01)
USPC .......................................... 290/1 A; 123/41.7

(58) Field of Classification Search

USPC .......................................... 290/1 A; 123/41.7
See application file for complete search history.

(56) References Cited

U.S. PATENT DOCUMENTS 4,835,405 A * 5/1989 Clancey et al. ............... 290/1 A
5,694,889 A * 12/1997 Ball et al. ..................... 123/41.7
5,890,460 A * 4/1999 Ball et al. ..................... 123/41.7
6,491,133 B2 * 12/2002 Yamada et al. ............... 181/200
6,660,967 B2 * 12/2003 Brofft et al. .................... 219/133
7,461,617 B2 * 12/2008 Onodera et al. .................. 123/2
7,513,223 B2 * 4/2009 Onodera et al. ............. 123/41.7
8,037,966 B2 * 10/2011 Errera et al. .................. 181/243
8,525,359 B2 * 9/2013 Nishimura et al. ........... 290/1 A
8,680,728 B2 * 3/2014 Errera et al. ..................... 310/86
8,859,928 B2 * 10/2014 Sommerfeld ............ 219/121.39

(Continued)

FOREIGN PATENT DOCUMENTS

CN 101109319 1/2008
CN 201103449 8/2008

(Continued)

OTHER PUBLICATIONS

Chinese Office Action dated Jun. 19, 2014, Application No. 201210413860.9; English translation included.

*Primary Examiner* — Pedro J Cuevas
(74) *Attorney, Agent, or Firm* — Rankin, Hill & Clark LLP

(57) ABSTRACT

The present invention provides an air cooling means forcibly cools inside of an operation box of controlling an engine generator by using engine cooling air. An engine generator has a generator driven by an engine and an operation box housing a controller for the generator. The engine is cooled by a fan. The operation box has an upper opening for taking outside air and a lower opening for exhausting air to the outside from the operation box. The lower opening is disposed so as to be oriented to the cooling air flow generated by the fan. A bottom plate of the operation box is disposed obliquely to an air intake port for taking air to the engine by the cooling fan for the engine, and the lower opening is opened in the bottom plate.

10 Claims, 8 Drawing Sheets

(56) References Cited

U.S. PATENT DOCUMENTS

| | | | | |
|---|---|---|---|---|
| 2001/0029908 | A1* | 10/2001 | Suzuki | 123/41.31 |
| 2002/0000342 | A1* | 1/2002 | Yamada et al. | 181/204 |
| 2003/0042237 | A1* | 3/2003 | Brofft et al. | 219/133 |
| 2005/0155959 | A1* | 7/2005 | Bender et al. | 219/133 |
| 2006/0043083 | A1* | 3/2006 | Bender et al. | 219/133 |
| 2008/0127912 | A1* | 6/2008 | Onodera et al. | 123/2 |
| 2008/0134996 | A1* | 6/2008 | Onodera et al. | 123/41.6 |
| 2009/0101630 | A1* | 4/2009 | Trinkner | 219/133 |
| 2009/0320458 | A1* | 12/2009 | Errera et al. | 60/324 |
| 2009/0321180 | A1* | 12/2009 | Errera et al. | 181/212 |
| 2009/0322096 | A1* | 12/2009 | Errera et al. | 290/1 A |
| 2009/0323256 | A1* | 12/2009 | Errera et al. | 361/622 |
| 2009/0323259 | A1* | 12/2009 | Errera et al. | 361/676 |
| 2010/0012636 | A1* | 1/2010 | Jochman | 219/133 |
| 2011/0204651 | A1* | 8/2011 | Nishimura et al. | 290/1 A |
| 2013/0026765 | A1* | 1/2013 | Errera et al. | 290/1 A |

FOREIGN PATENT DOCUMENTS

| | | | |
|---|---|---|---|
| CN | 102042082 | 5/2011 | |
| JP | 63-125129 | 8/1988 | |
| JP | 5-058826 | 8/1993 | |
| JP | 2005-042644 | 2/2005 | |
| JP | 2013092085 A * | 5/2013 | F01P 5/06 |
| WO | 2012/100635 | 8/2012 | |

* cited by examiner

ENGINE OPERATING MACHINE

The present invention relates to an engine operating machine and, more particularly, relates to an engine operating machine having a configuration of increasing an effect of cooling an operation box.

BACKGROUND ART

An engine generator as an operating machine driven by an engine is provided with an operation board or an operation box. The operation box has therein a device (AVR) for automatically controlling output voltage generated by the engine generator, an electric wire, and the like, and produces heat when current flows. The heat increases temperature in the operation box and exerts an adverse influence on electronic parts. Consequently, a measure to avoid temperature rise is taken.

For example, Japanese Utility Model Application Laid-Open (JP-U) No. 63-125129 discloses an engine generator having a control box disposed on the generator. A port communicated with the control box is provided in a rear-part peripheral wall of the generator, and the control box has an outside air intake port. In the engine generator, the inside of the control box is cooled by making outside air taken from the outside air intake port, pass through the communication port, and circulated in the casing of the generator by suction force generated by a ventilation fan.

Japanese Utility Model Application Laid-Open (JP-U) No. 05-58826 discloses a structure, in a soundproof case in which cooling air from a cooling fan is sucked in a fan case of an engine, circulated around the engine, and discharged and, an operation board is positioned on the front side of an upper half of the fan case.

CITATION LIST

Patent Literature

Patent Literature 1; Japanese Utility Model Application Laid-open (JP-U) No. 63-125129

Patent Literature 2; Japanese Utility Model Application Laid-open (JP-U) No. 05-58826

SUMMARY OF INVENTION

Technical Problem

In the device described in Japanese Utility Model Application Laid-Open (JP-U) No. 63-125129, the guidance port for taking air into the generator by the ventilation fan opens to the inner space covered with a rear-part case. Consequently, outside air introduced from the control box via the communication port and outside air introduced from an air supply port formed in the rear-part case are merged in the inner space and sucked to the guidance port. That is, the outside air from the air supply port is directly introduced to the guidance port and, on the other hand, the outside air from the outside air intake port in the control box passes through the communication port and is introduced to the guidance port. Since the flow path resistance in the air supply path extending from the outside air intake port in the control box via the communication port to the guidance port is higher than that in the air supply path by which outside air is introduced from the air supply port to the guidance port, the flow rate of air which flows in the guidance port via the communication port becomes lower than that of air which directly flows from the air supply port to the guidance port. There is consequently a problem such that an effect of sufficient cooling the control box is not easily obtained.

Further, in the device described in Japanese Utility Model Application Laid-Open (JP-U) No. 63-125129, the outside air intake port is provided in the side wall of the control box, and the wall is adjacent to the communication port. Consequently, the outside air does not easily flow in space adjacent to a wall apart from the outside air intake port, so that the cooling effect is small in the space.

The soundproof case described in Japanese Utility Model Application Laid-Open (JP-U) No. 5-58826 is constructed so that radiation heat from the engine is not easily transmitted to the operation board. The operation board is provided in an upper part of a soundproof room partitioned by a partition plate provided between the soundproof room and an air supply room, and air flow is not easily generated around the operation board. There is consequently a problem that heat tends to stay.

In view of the problems, an object of the present invention is to provide an engine operating machine with an increased effect of cooling an operation box by making cooling air generated by operation of an engine effectively acted.

Solution to Problem

A first feature of the present invention to accomplish aforementioned object is an engine operating machine including an engine (2), an operating machine (3) driven by the engine (2), and an operation box (5) housing a controller for the operating machine (3), comprising a fan (2*a*) for cooling the engine (2) and the operating machine (3), wherein the operation box (5) has an upper opening (33) for taking outside air, which is provided in an upper part of the operation box (5), and a lower opening (32) for exhausting air to the outside, which is provided in a bottom part of the operation box (5), and the lower opening (32) in the operation box (5) is disposed so as to be oriented to a flow of cooling air generated by the fan (2*a*).

The second feature of the present invention is that the fan (2*a*) is provided on the engine (2) side in the operating machine (3), the engine (2) has an air intake port (20) for taking air outside of the engine (3) by rotation of the fan (2*a*), the operation box (5) has a bottom plate (16*a*) disposed obliquely to an outer face of the air intake port (20) of the engine (2), and the lower opening (32) is opened in the bottom plate (16*a*) so as to directly face from obliquely upward the outer face of the air intake port (20).

The third feature of the present invention is that the operation box (5) further comprises a top plate (16*e*) and vertical plates (16*b*, 16*c*, and 16*d*) vertically joined to the bottom plate (16*a*), and the upper opening (33) is formed in any of the top plate (16*e*) and an upper part of the vertical plates (16*b*, 16*c*, and 16*d*).

The fourth feature of the present invention is that the lower opening (32) includes a plurality of long holes (32*a*) and blinds (32*b*) each projected from an upper end of the long hole (32*a*) to the front face of the long hole (32*a*).

Advantageous Effects of Invention

According to the present invention having the above-described features, since an opening is provided in each of an upper part of an operation box and a bottom plate, by the flow of cooling air generated by a cooling fan, the flow of air from the upper opening to the lower opening is generated in the operation box. All of parts housed in the operation box are cooled by the flow of air generated by forced convection, not natural convection.

According to the present invention having the second characteristic, the bottom plate in which the lower opening is formed is not orthogonal to the flow of air which flows in the air intake port of the engine but obliquely crosses the air flow. Therefore, the action of discharging air to the outside works more in the operation box, the flow rate of air generated in the operation box is further increased, and a high cooling effect can be obtained.

According to the present invention having the third characteristic, an upper opening is formed in the top plate of the operation box. Consequently, the cooling air can be circulated in a region lower than the top plate, that is, in the entire operation box.

According to the present invention having the fourth characteristic, the blind prevents intrusion of water and dusts from the lower opening as the air exhaust port to the inside of the operation box.

DESCRIPTION OF EMBODIMENTS

Figure 1:
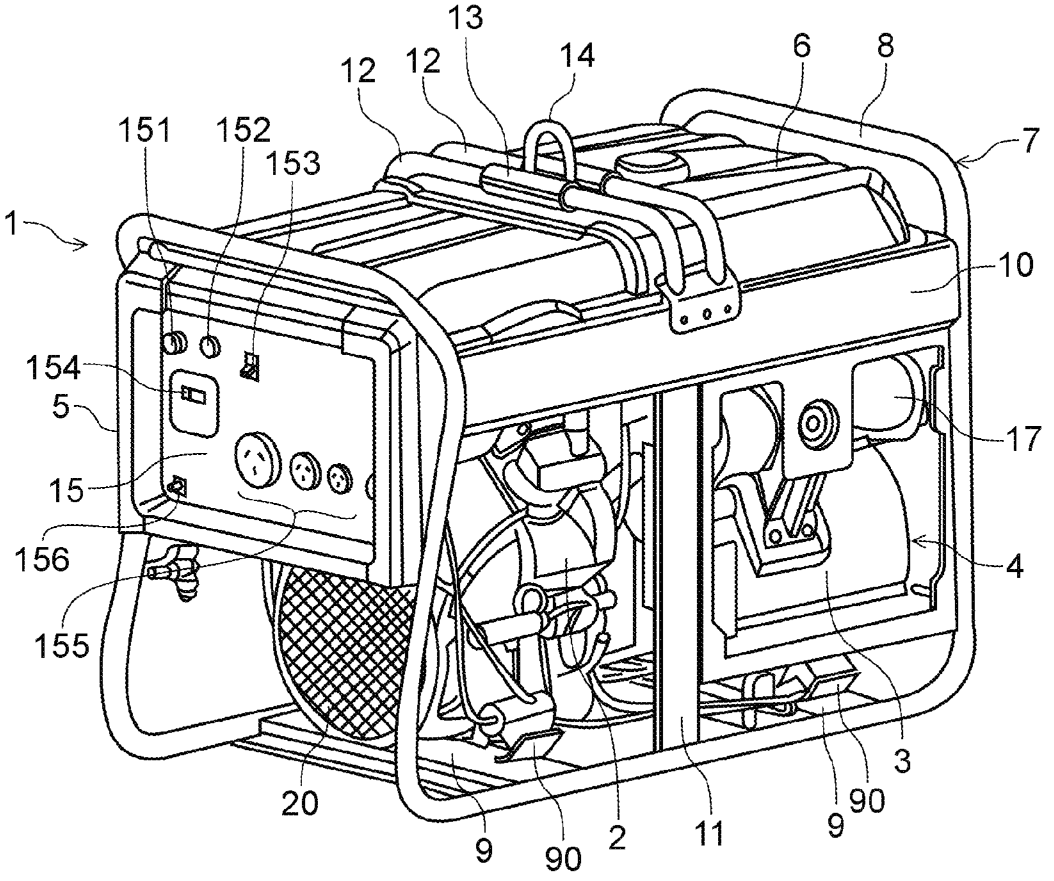
FIG. 1 is an oblique perspective figure of the engine generator according to the one embodiment of the present invention.
Figure 2:
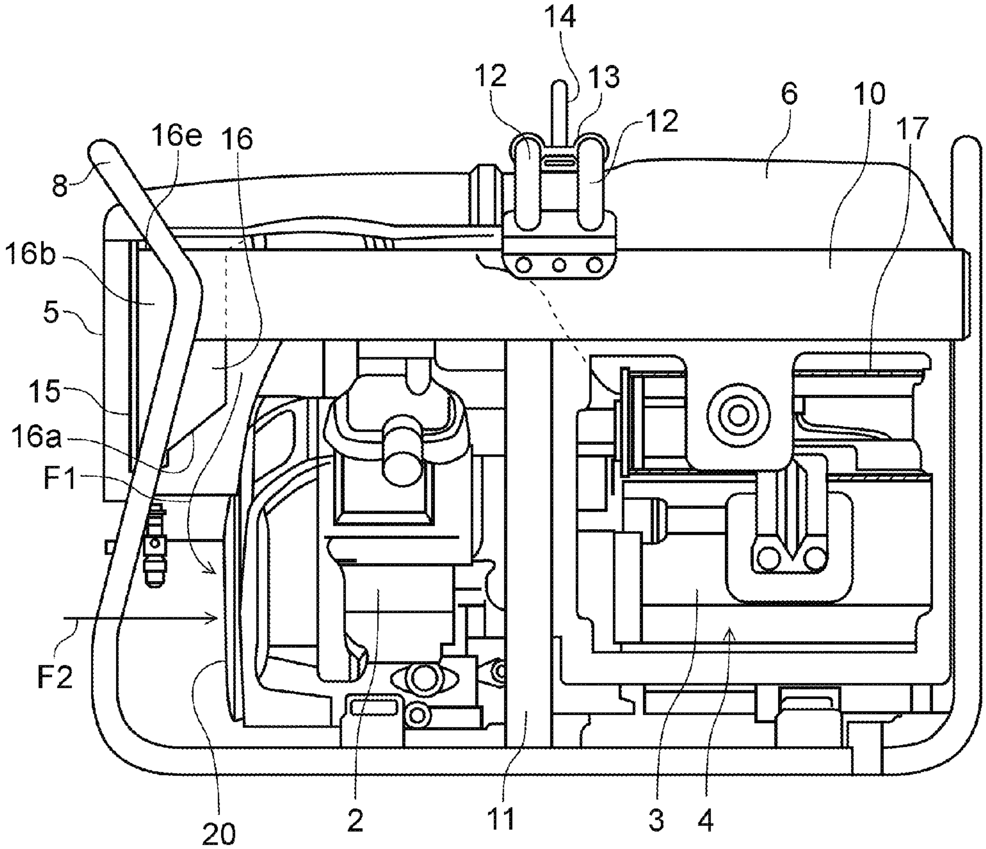
FIG. 2 is a left side elevation view of the engine generator according to the one embodiment of the present invention.

Hereinafter, an embodiment of the present invention will be described with reference to the drawings. FIG. 1 is a perspective view of an engine generator as an engine operating machine according to the embodiment of the present invention. FIG. 2 is a side view of the engine generator. In FIGS. 1 and 2, an engine generator 1 has an engine 2 and a generator 3 driven by the engine 2. Hereinafter, the engine 2 and the generator 3 will be collectively called a generator body 4. In the engine generator 1, the side on which the engine 2 in the generator body 4 is disposed is called a front side, and the side on which the generator 3 is disposed is called a rear side.

The generator body 4 is surrounded by an external frame 7. The external frame 7 includes a main frame 8 made of a steel pipe, lower beams 9 coupling lower parts of the main frame 8 in the horizontal direction, two upper beams 10 coupling upper parts of the main frame 8 in the longitudinal direction, and perpendicular beams 11 each downwardly extending from an intermediate part in the longitudinal direction of the upper beam 10 and coupled to the lower part of the main frame 8. The two lower beams 9 are provided at an interval in the longitudinal direction, one upper beam 10 is provided on the right side, the other upper beam 10 is provided on the left side, one perpendicular beam 11 is provided on the right side, and the other perpendicular beam 11 is provided on the left side. That is, a pair of the upper beam 10 and the perpendicular beam 11 is provided on each of the right and left sides. Although only the upper beam 10 and the perpendicular beam 11 positioned on the left side of the generator 3 are shown, the upper beam 10 and the perpendicular beam 11 on the right side are also provided in similar positions.

A fuel tank 6 is formed so as to widely cover the entire upper part of the generator body 4, assures large capacity, and also acts as a generator body cover which suppresses falling of water and dust from above to the generator body 4. Two lateral pipes 12 whose both ends are coupled to the right and left upper beams 10 are provided in the lateral direction over the fuel bank 6. The two lateral pipes 12 are coupled to each other by a bracket 13, and a ring 14 is joined to the bracket 13.

There is provided a muffler 17 coupled to an exhaust pipe led between the engine 2 and the generator 3 and extending in the longitudinal direction above the left side of the generator 3. The generator body 4 is mounted in the external frame 7 by mount devices 90 with buffer members fixed in four places of front, rear, right, and left places on the lower beams 9 and 9. The mount device 90 has a buffer member (made of, for example, rubber) so that the generator body 4 can displace within a predetermined range in the horizontal and vertical directions, and can absorb vibrations accompanying operation.

The engine 2 is an air-cooled four-cycle engine and is cooled by outside air taken from an air intake port 20 provided on the front side of the engine 2. On the rear side or the back side of the air intake port 20, a fan 2*a* for cooling (to be described later with reference to FIG. 10) which is coupled to the engine 2 and is rotated is provided. By the rotation of the fan 2*a*, flows F1 and F2 of air taken in the engine 2 are generated. The fan for cooling may be provided not only for the engine 2 but also the generator 3.

An operation box 5 for operating the working of the engine generator 1 is provided adjacent to the engine 2 and above the front side of the air intake port 20, and the fuel tank 6 is provided behind the operation box 5. The operation box 5 has an operation panel 15 and a case 16 existing on the back side of the operation panel 15 and housing parts for various controls including an automatic voltage regulator (AVR) and electric wires. In the operation panel 15, a choke button 151, an engine switch 152, a breaker switch 153, a liquid crystal monitor 154, a plurality of outlets 155, an earth terminal 156, and the like are disposed.

Since particularly the flow F1 in the flows F1 and F2 of air taken in the engine 2 is along the case 16 of the operation box 5, the pressure in the outer periphery of the case 16, particularly, around the lower part is lower than that in the upper part of the case 16 where there is no flow of air. Therefore, by providing an opening in each of a bottom plate 16*a* of the case 16 and an upper part (an extension plate 15*a* which is joined to the upper part of the operation panel 15), flow of air exhausted from the opening in the lower part of the case 16 to the outside is generated and, accompanying the flow of air, fresh air is taken from the opening in the upper part to the inside of the case 16. Such a flow of air is continued during the operation of the engine 2, and the inside of the case 16 of the operation box 5 is forcibly cooled by air.

Figure 3:
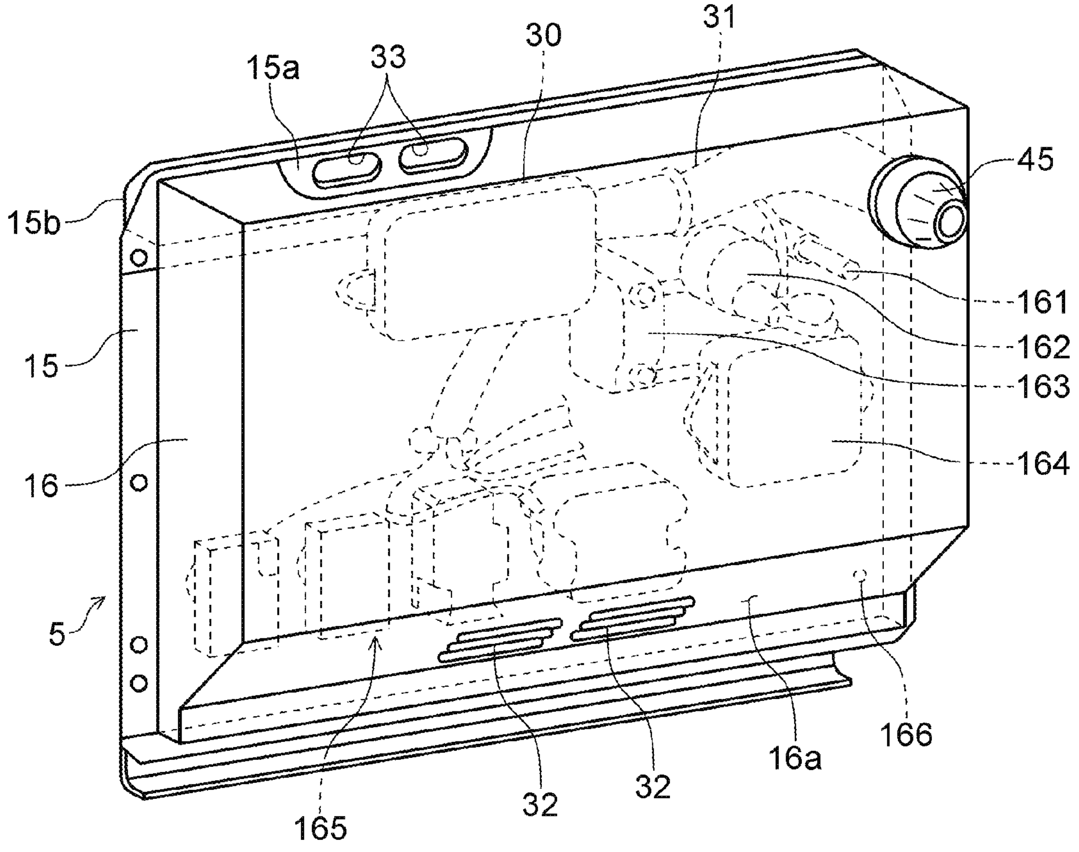
FIG. 3 is a left rearward perspective view of the engine generator according to the one embodiment of the present invention.

In the specification, "upper part" of the case 16 or the operation box 5 refers to a part upper than the center of width in the vertical direction of a member disposed in the uppermost part among members housed in the operation box 5, for example, refers to a part upper than the center of width in the vertical direction of an AVR 30 (refer to FIG. 3). Preferably, the "upper part" is a region corresponding to the part of upper 20% of the volume of the case 16. When an upper opening is set in a region lower than the region, all of members in the operation box 5 cannot be effectively cooled.

Particularly, in the operation box 5 shown in FIG. 2, the bottom plate 16*a* of the case 16 is disposed not perpendicular to the rear face (vertical wall) of the case 16 (that is, not as a horizontal face) but disposed, as a tilted face whose front side is low and whose rear side is high, obliquely facing also the air intake port 20. Consequently, the flow rate of the air F1 flowing along the bottom plate 16*a* becomes higher, and the pressure difference between the periphery of the lower part of the case 16 and the upper part of the case 16 can be further increased. Although it is preferable to dispose the bottom plate 16*a* so as to obliquely face the air intake port 20, the bottom plate 16*a* is not limited to the oblique posture but may be perpendicular to the air intake port 20.

FIG. 3 is a rearward perspective view of the operation box 5. In the front part of the operation box 5, that is, on the rear face of the operation panel 15, bodies (parts on the rear face side) 161, 162, 163, 164, 165, and 166 of the choke button 151, the engine switch 152, the breaker switch 153, the liquid crystal monitor 154, the outlets 155, and the earth terminal 156, respectively, are attached. The AVR 30 is attached to the rear face of the operation panel 15, electric wires connected to the body parts of the AVR 30 and switches and the like in the case 16 are lumped together as a harness 31 which is led to the outside via a grommet 45 fit in a harness hole (which will be described later) formed in the rear face of the case 16.

Exhaust ports 32 as a plurality of elongated openings (refer to FIG. 9) are formed in the under face of the case 16. On the other hand, in the extension plate 15*a* joined to the upper part of the operation panel 15, a plurality of openings are provided as intake ports 33 in proximity to the AVR 30. The extension plate 15*a* faces an upper rim 15*b* formed by bending an upper part of the operation panel 15, and the intake ports 33 are disposed in positions facing the space between the rear face of the upper rim 15*b* and the extension plate 15*a*.

Figure 4:
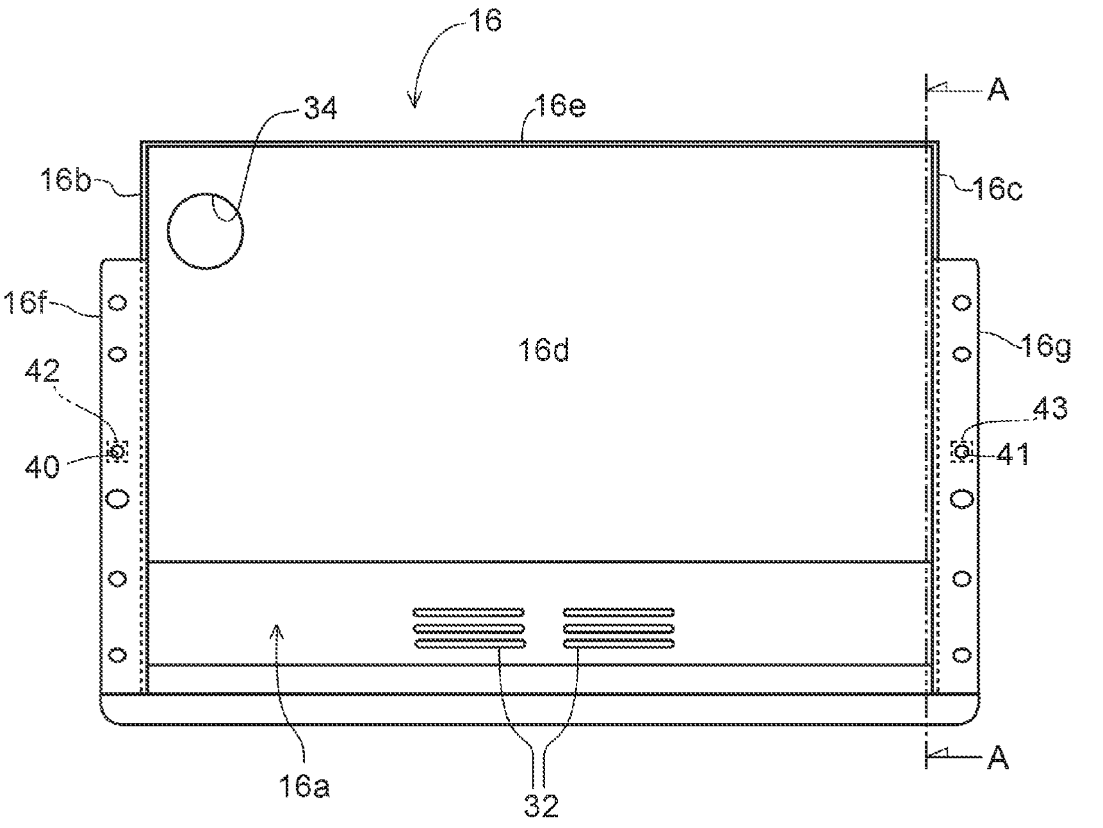
FIG. 4 is a front view of the case constituting the operating box of the engine generator.
Figure 5:
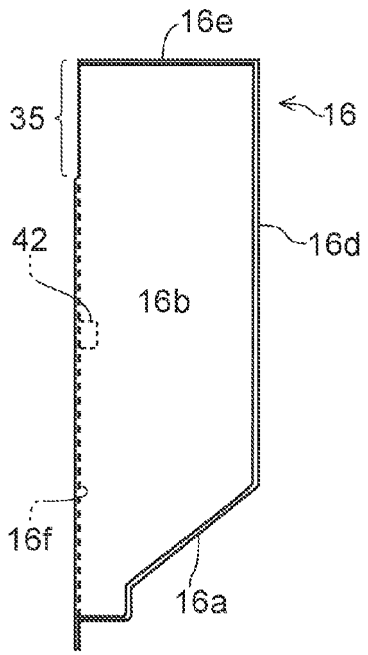
FIG. 5 is a cross section taken along line A-A of FIG. 4.
Figure 6:
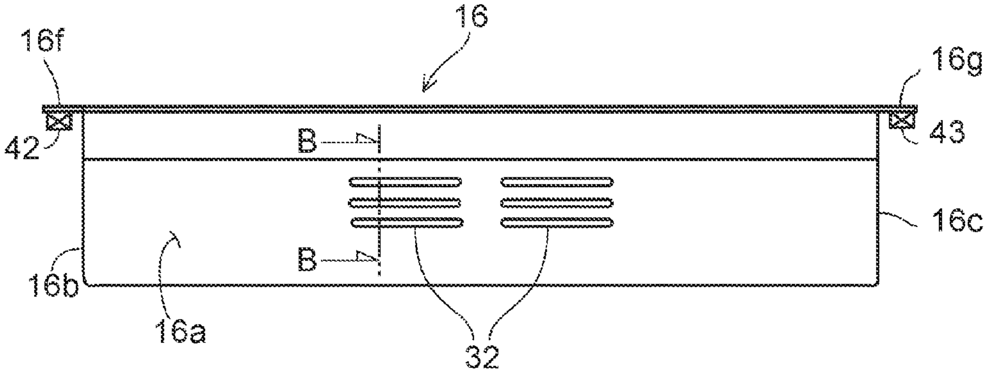
FIG. 6 is a bottom view of the case constituting the operation box of the engine generator.

FIG. 4 is a front view of the case 16 (view from the operation panel 15 side), FIG. 5 is a cross section taken along line A-A of FIG. 4, and FIG. 6 is a bottom view of the case 16. In FIGS. 4 to 6, the case 16 has the lower plate (bottom plate) 16*a*, right and left walls 16*c* and 16*b*, a perpendicular wall (vertical plate) 16*d*, and a top plate (ceiling) 16*e*, and has a box shape whose face on the side to which the operation panel 15 is attached is open.

Fitting flanges 16*g* and 16*f* are formed in the right and left walls 16*c* and 16*b*. Nuts 42 and 43 are aligned and welded in holes 40 and 41 in a number of fitting holes formed in the flanges 16*g* and 16*f*. Bolts (not shown) are fit from the operation panel 15 side into the holes 40 and 41 and screwed in the nuts 42 and 43.

In the bottom plate 16*a* which is set obliquely to the perpendicular wall 16*d*, the exhaust ports 32 described above with reference to FIG. 3 are opened. Near the upper corner of the perpendicular wall 16*d*, the grommet hole 34 in which the grommet 45 is to be fit is opened. The flanges 16*f* and 16*g* are not extended to a range 35 between the upper end of the flanges 16*f* and 16*g* and the top plate 16*e*. In a part to where the flanges 16*f* and 16*g* are not extended, a gap may exist between the operation panel 15 and the case 16 when the case 16 is combined to the operation panel 15. Then, both ends of the extension plate 15*a* joined to the upper part of the operation panel 15 can be fit in the gap.

Figure 7:
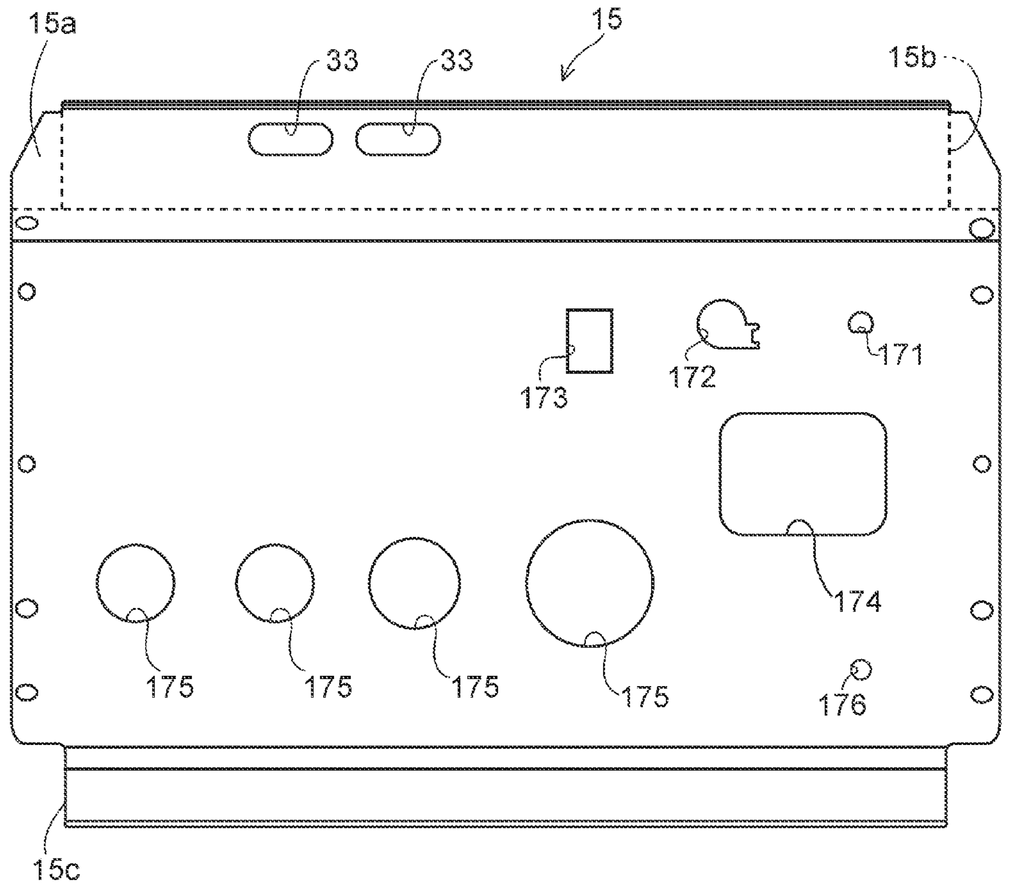
FIG. 7 is a back side view of the operation panel.
Figure 8:
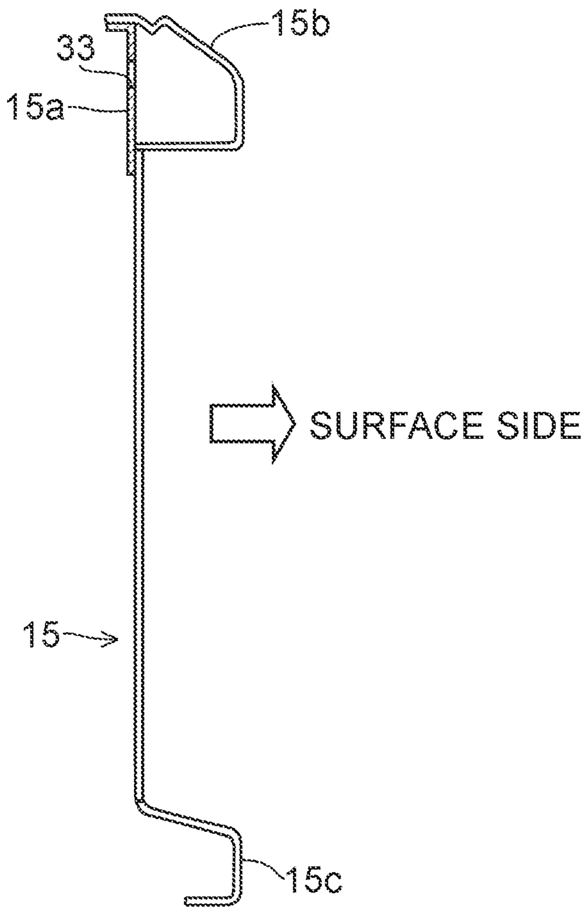
FIG. 8 is a right side elevation view of the operating panel.

FIG. 7 is a front view of the operation panel 15 (view from the case 16 side), and FIG. 8 is a side view of the operation panel 15. In FIGS. 7 and 8, upper and lower parts of the operation panel 15 are bent to form an upper rim 15*b* and a lower rim 15*c* projected to the operation face side (surface side). To the operation panel 15, the extension plate 15*a* is joined so as to cover a part opposite to the operation face, of the upper rim 15*b*, that is, the space on the rear side of the upper rim 15*b*. In the extension plate 15*a*, the openings as the intake ports 33 described with reference to FIG. 3 are opened in two places.

In the operation panel 15, fitting holes 171, 172, 173, 174, 175, and 176 for attaching the bodies 161, 162, 163, 164, 165, and 166 of the choke button 151, the engine switch 152, the breaker switch 153, the liquid crystal monitor 154, the outlets 155, and the earth terminal 156, respectively, are opened.

Figure 9:
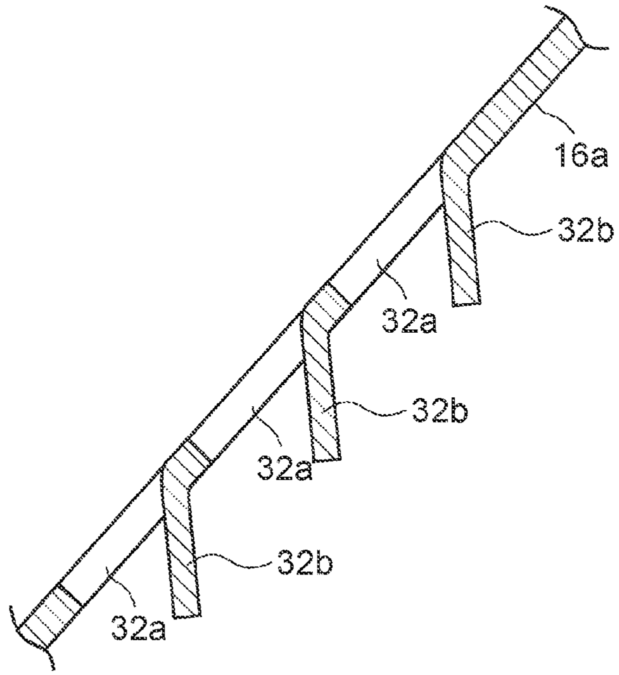
FIG. 9 is a cross section taken along line B-B of FIG. 6.

FIG. 9 is a cross section taken along line B-B of FIG. 6. In FIG. 9, in the exhaust port 32 as the lower opening, a plurality of long holes 32*a* is opened. The front face of each of the long holes 32*a* is provided with a blind 32*b* projecting from the upper end of the long holes 32*a* and extending almost perpendicularly from the bottom plate 16*a*. The blinds 32*b* play the role of preventing intrusion of water and dusts from above to the operation box 5 through the long holes 32*a*. The blinds 32*b* can be formed integrally so as to be projected from the bottom plate 16*a* at the time of forming the long holes 32*a* by embossing.

Figure 10:
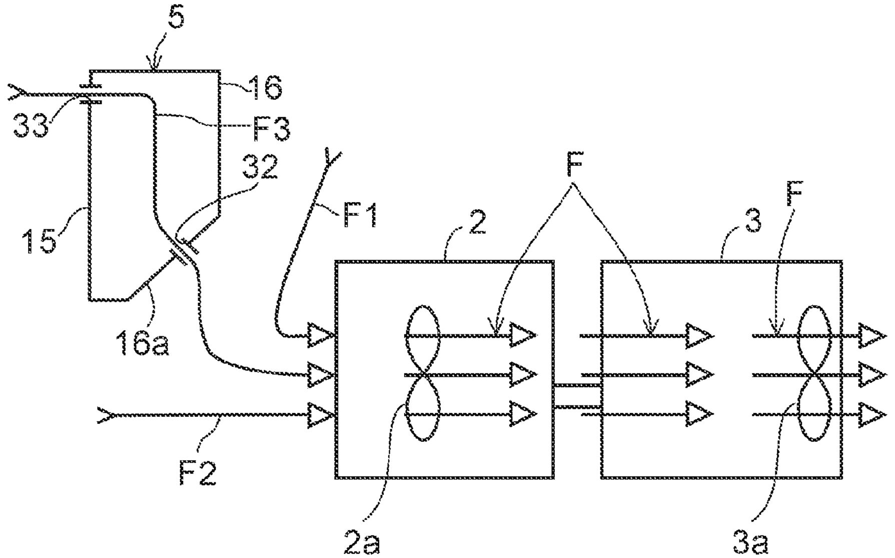
FIG. 10 is a schematic diagram of the engine generator for explaining the flow of cooling air.

FIG. 10 is a schematic diagram of the engine generator for explaining the flow of cooling air. In FIG. 10, the outside air is taken in the engine 2 by the cooling fan 2*a* of the engine 2. The flow F of the air which cooled the engine 2 is taken in the generator 3 by the other cooling fan 3*a* provided on the generator 3 side, passes through the generator 3, and is exhausted to the outside.

By the flow F, the air flows F1 and F2 are generated on the front side of the engine 2. By the air flows F1 and F2, negative pressure is generated on the outside of the bottom plate 16*a* of the case 16. Consequently, air is exhausted from the exhaust ports 32 in the case 16 and air flows in the case 16 from the intake ports 33. That is, a flow F3 of air vertically flowing in the operation box 5 is generated so that the operation box 5 is forcibly ventilated and cooled.

Although the present invention has been described by the embodiment, the invention is not limited to the embodiment and modification is possible on the basis of the matters described in the scope of claims for patent and known techniques. For example, the present invention is not limited to an engine generator but can be widely applied to an engine operating machine driven by an engine. Examples of the engine operating machine include not only a power generator but also a water pump driven by an engine and a high-pressure washing machine for pressure-feeding water by a water pump.

Although the intake port 33 is formed in the upper part of the operation panel 15, in place of the intake port 33, an opening may be formed in the top plate 16*e* of the case 16. In short, it is sufficient to form an opening in the upper part of the operation box 5 so that outside air is taken in the operation box 5 (the space surrounded by the operation panel 15 and the case 16) from a part close to the uppermost part of the operation box 5. In other words, as long as the intake port 33 is disposed upper than the components such as the AVR 30 and the harness 31 housed in the operation box 5, an effect that all of the components of the operation box 5 can be cooled by the air flow F3 is obtained.

Although the exhaust port 32 in the operation box 5 is disposed so as to face the air intake port 20 of the engine 2, the exhaust port 32 does not always have to face the air intake port 20 of the engine 2 but may open at least toward the flow of air generated by the cooling fan. Although FIG. 10 shows the example that the cooling fan is provided for each of the engine 2 and the generator 3, a cooling fan may be provided for only one of the engine 2 and the generator 3.

REFERENCE SIGNS LIST

1 . . . engine generator
2 . . . engine
3 . . . generator
4 . . . generator body
5 . . . operation box
6 . . . fuel tank
7 . . . external frame
15 . . . operation panel
16 . . . case
20 . . . air intake port
32 . . . exhaust port
33 . . . intake ports

The invention claimed is:

1. An engine operating machine, comprising an engine, an operating machine driven by the engine, an operation box housing a controller for the operating machine, and a fan for cooling the engine and the operating machine, wherein the operation box has an upper opening for taking outside air, which is provided in an upper part of the operation box, and a lower opening for exhausting air to an outside, which is provided in a bottom part of the operation box, the lower opening in the operation box is disposed so as to be oriented to a flow of cooling air generated by the fan, the fan is provided on the engine side in the operating machine, the engine has an air intake port for taking air outside of the engine by rotation of the fan, the operation box has a bottom plate disposed obliquely to an outer face of the air intake port of the engine, and the lower opening is opened in the bottom plate so as to directly face from obliquely upward the outer face of the air intake port.

2. The engine operating machine according to claim 1, wherein the operation box further comprises a top plate and vertical plates vertically joined to the bottom plate, and the upper opening is formed in any of the top plate and an upper part of the vertical plates.

3. The engine operating machine according to claim 1, wherein the lower opening includes a plurality of long holes and blinds each projected from an upper end of the long hole to the front face of the long hole.

4. The engine operating machine according to claim 1, wherein the fan is provided on the engine.

5. The engine operating machine according to claim 1, wherein the fan is provided for both of the engine and the operating machine.

6. The engine operating machine according to claim 1, wherein the operating machine is a generator driven by an engine.

7. The engine operating machine according to claim 2, wherein the operating machine is a generator driven by an engine.

8. The engine operating machine according to claim 3, wherein the operating machine is a generator driven by an engine.

9. The engine operating machine according to claim 4, wherein the operating machine is a generator driven by an engine.

10. The engine operating machine according to claim 5, wherein the operating machine is a generator driven by an engine.

* * * * *